(12) United States Patent
Terry

(10) Patent No.: US 8,873,604 B2
(45) Date of Patent: Oct. 28, 2014

(54) METHOD AND APPARATUS FOR MULTIPLE SIGNAL AGGREGATION AND RECEPTION IN DIGITAL CHAOS NETWORK

(76) Inventor: John David Terry, Annandale, VA (US)

(*) Notice: Subject to any disclaimer, the term of this patent is extended or adjusted under 35 U.S.C. 154(b) by 0 days.

(21) Appl. No.: 13/429,809

(22) Filed: Mar. 26, 2012

(65) Prior Publication Data

US 2014/0169407 A1 Jun. 19, 2014

(51) Int. Cl.
*H04B 1/00* (2006.01)
*H04B 1/707* (2011.01)

(52) U.S. Cl.
CPC ................................. *H04B 1/707* (2013.01)
USPC ........................................................ 375/141

(58) Field of Classification Search
CPC . H04B 7/0452; H04B 7/0413; H04J 13/0018; H04J 13/10; H04L 27/001
USPC ........................................................ 375/141
See application file for complete search history.

(56) References Cited

U.S. PATENT DOCUMENTS

| | | | |
|---|---|---|---|
| 6,108,564 A | 8/2000 | Minkoff | |
| 6,744,893 B1 * | 6/2004 | Fleming-Dahl | 380/263 |
| 6,788,787 B1 * | 9/2004 | Shono et al. | 380/46 |
| 6,882,689 B2 | 4/2005 | Maggio et al. | |
| 7,228,113 B1 | 6/2007 | Tang et al. | |
| 7,269,127 B2 | 9/2007 | Mody et al. | |
| 7,583,758 B2 | 9/2009 | Gaikwad et al. | |
| 7,664,192 B2 | 2/2010 | Yun et al. | |
| 7,697,590 B2 | 4/2010 | Umeno et al. | |
| 7,733,939 B2 | 6/2010 | Trachewsky | |
| 7,751,488 B2 | 7/2010 | Moffatt | |
| 7,839,939 B2 | 11/2010 | Lee et al. | |
| 8,428,103 B2 * | 4/2013 | Chester et al. | 375/141 |
| 2001/0038356 A1 * | 11/2001 | Frank | 343/853 |
| 2004/0151266 A1 | 8/2004 | Sud et al. | |
| 2009/0003418 A1 * | 1/2009 | Karabinis | 375/219 |
| 2009/0034727 A1 * | 2/2009 | Chester et al. | 380/263 |
| 2009/0310650 A1 * | 12/2009 | Chester et al. | 375/146 |
| 2010/0054225 A1 * | 3/2010 | Hadef et al. | 370/342 |
| 2010/0248680 A1 * | 9/2010 | Agulnik et al. | 455/404.2 |
| 2010/0309957 A1 * | 12/2010 | Chester et al. | 375/146 |

* cited by examiner

*Primary Examiner* — Juan A Torres
(74) *Attorney, Agent, or Firm* — Patrick L. Mixon

(57) ABSTRACT

The present invention teaches method and apparatus to transform a featureless, unpredictable, and non-repeatable chaos waveform into digital chaos waveforms that maintain featureless characteristics to serve as a for wireless communications protocol, whereby unintended observers cannot detect or disrupt yet imprint a small measure of predictability and repeatability to aid intend observers in recovering embedded information. This invention discloses wireless communication systems with multiple signal aggregation at the transmitter and multiple detection at the receiver that uses embedding digital signals and digital information within multiple digital chaos waveforms.

4 Claims, 8 Drawing Sheets

US 8,873,604 B2

METHOD AND APPARATUS FOR MULTIPLE SIGNAL AGGREGATION AND RECEPTION IN DIGITAL CHAOS NETWORK

FEDERAL FUNDING LEGEND

This invention was produced in part using funds obtained through a grant from the Army Small Business Innovation Research. Consequently, the federal government has certain rights in this invention.

FIELD OF INVENTION

This invention relates generally to wireless communication systems with multiple signal aggregation at the transmitter and multiple detection at the receiver. In particular, this invention relates to embedding digital signals and digital information within multiple digital chaos waveforms.

BACKGROUND OF INVENTION

A wireless communication device in a communication system communicates directly or indirectly with other wireless communication devices. For direct/point-to-point communications, the participating wireless communication devices tune their receivers and transmitters to the same channel(s) and communicate over those channels. For indirect wireless communications, each wireless communication device communicates directly with an associated base station and/or access point via an assigned channel.

Each wireless communication device participating in wireless communications includes a built-in radio transceiver (i.e., transmitter and receiver) or is coupled to an associated radio transceiver. Typically, the transmitter includes at least one antenna for transmitting radiofrequency (RF) signals, which are received by at least one antenna of the receiver. When the receiver includes two or more antennas, the receiver selects one of antennas to receive the incoming RF signals. Wireless communications between the transmitter with one antenna and receiver with antenna is known as a single-output-single-input (SISO) communications.

Well known communications systems provide a range extension on a SISO system by reducing the data rate and, as a result, increase the symbol duration and/or increasing transmit power. However, increasing transmit power can lead to increase interference to other users sharing the network. Therefore, what is needed is method for improved range reception that does not lead to decreased network capacity or increased susceptibility to interference of the wireless device.

Generally speaking, transmission systems compliant with the IEEE 802.11a and 802.11g or "802.11a/g" as well as the 802.11n standards achieve their high data transmission rates using Orthogonal Frequency Division Modulation (OFDM) encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Similarly, multi-code spread spectrum system comprised of perfectly orthogonal high-speed chaos spreading codes transporting independent modulated data can be used to increase its overall throughput or transmission rate of the SISO system. The high-speed "spreading signals" belong to the class of signals referred to as Pseudo Noise (PN) or pseudo-random signal. This class of signals possesses good autocorrelation and cross-correlation properties such that different PN sequences are nearly orthogonal to one other. The autocorrelation and cross-correlation properties of these PN sequences allow the original information bearing signal to be spread at the transmitter.

Transmitters used in the wireless communication systems that are compliant with the aforementioned 802.11a/802.11g/802.11n standards as well as other standards such as the 802.16a IEEE Standard, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a high peak-to-average ratio (PAR).

Transmitters used in direct sequence spread spectrum (DSSS) wireless communication systems such as those compliant with commercial telecommunication standards WCDMA and CDMA 2000 perform high-speed spreading of data bits after error correction, interleaving and prior to symbol mapping. Thereafter, the digital signal is converted to analog form and frequency translated using conventional RF upconversion methods. The combined signals for all DSSS signals are appropriately power amplified and transmitted to one or more receivers.

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain signal. Whereas receivers used for reception for DSSS must de-spread the high signal after baseband downconverting to restore the original information signal band but yields a processing gain equal to the ratio the high speed signal to information bearing signal. Thereafter, the baseband processor performs demodulation and frequency domain equalization (FEQ) to recover the transmitted symbols, and these symbols are then processed with an appropriate FEC decoder, e.g. a Viterbi decoder, to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted and 3GPP-LTE Advanced and IEEE 802.16m under development. As is known, the use of MIMO technology produces significant increases in spectral efficiency, throughput and link reliability, and these benefits generally increase as the number of transmission and receive antennas within the MIMO system increases.

In particular, in addition to the frequency channels created by the use of OFDM, a MIMO channel formed by the various transmissions and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multipath effects) across the overall system bandwidth and may therefore achieve different signal-to-noise ratio (SNRs) at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band. Whereas DSSS signal occupies the entire channel band, the number of information bits per modulation symbol (i.e., the data rate) that may be transmitted using the different chaos sequence for each spatial channel for a particular level of performance.

In the MIMO-OFDM communication system using a typical scheme, a high Peak-to-Average Power Ratio (PAPR) may be caused by the multiple carrier modulation. That is, because data are transmitted using multiple carriers in the MIMO-OFDM scheme, the final OFDM signals have amplitude obtained by summing up amplitudes of each carrier. The high PAPR results when the carrier signal phases are added constructively (zero phase difference) or destructively (±180 phase difference). Notably, OFDM signals have a higher peak-to-average ratio (PAPR) often called a peak-to-average power ratio (PAPR) than single-carrier signals do. The reason is that in the time domain, a multicarrier signal is the sum of many narrowband signals. At some time instances, this sum is large and at other times is small, which means that the peak value of the signal is substantially larger than the average value. Similarly, MIMO-DSSS schemes can have high PAPR for periodic sequence or binary-valued sequence; however chaos spreading sequences do not exhibit either of these characteristics and therefore have better PAPR performance for SISO and MIMO operations.

The continually increasing reliance on SISO and especially MISO wireless forms of communication creates reliability and privacy problems. Data should be reliably transmitted from a transmitter to a receiver. In particular, the communication should be resistant to noise, interference, and possibly to interception by unintended parties.

In the last few years there has been a rapidly growing interest in ultra-wide bandwidth (UWB) impulse radio (IR) communication systems. These systems make use of ultra-short duration pulses that yield ultra-wide bandwidth signals characterized by extremely low power spectral densities. UWB-IR systems are particularly promising for short-range wireless communications as they combine reduced complexity with low power consumption, low probability of detection (LPD), immunity to multipath fading, and multi-user capabilities. Current UWB-IR communication systems employ pseudo-random noise (PN) coding for channelization purposes and pulse-position modulation (PPM) for encoding the binary information.

Others have proposed a periodic sequences of pulses in the context of chaos-based communication system. Additional work has relied upon the self-synchronizing properties of two chaotic systems. In such a system, data is modulated into pulse trains using variable time delays and is decodable by a coherent receiver having a chaotic generator matched to the generator used in the transmitter. Such system is known in the art as a Chaotic Pulse Position Modulation (CPPM) scheme.

Such chaotic dynamical systems have been proposed to address the problem of communication privacy. Chaotic signals exhibit a broad continuous spectrum and have been studied in connection with spread-spectrum applications. The irregular nature of a chaotic signal makes it difficult to intercept and decode. In many instances a chaotic signal will be indistinguishable from noise and interference to receivers not having knowledge of the chaotic signal used for transmission. In the context of UWB systems the use of non-periodic (chaotic) codes enhances the spread-spectrum characteristics of the system by removing the spectral features of the signal transmitted. This results in a lower probability of interception/detection (LPI/LPD) and possibly less interference towards other users. This makes the chaos-based communication systems attractive.

There remains a need for improved chaotic coding/modulation methods to produce such attractive communication systems. One prior art, U.S. Pat. No. 6,882,689, issued Apr. 15, 2005 to Maggio et al., attempts to improve chaotic coding using pseudo-chaotic coding/modulation method that exploits the symbolic dynamics of a chaotic map at the transmitter to encode data. The method uses symbolic dynamics as "coarse-grained" description of the evolution of a dynamic system. The state space is partitioned and a symbol is associated with each partition. The Maggio invention uses a trajectory of the dynamic system and analyzes it as a symbolic system. A preferred transmitter of the Maggio prior art accepts digital data for coding and the digital data is allocated to symbolic states according to a chaotic map using a shift register to approximate the Bernoulli shift map acting as a convolution code with a number of states equal to the symbolic states defined on the chaotic map. The pseudo-chaotically coded data is converted to analog form and modulated into synchronization frames in a transmitted signal.

The Maggio prior art has limitations in that it uses only one chaos map (e.g., Bernoulli shift map) that is generated based on the data transmitted. By confining the mapping to Bernoulli shift, information that is repeated in each transmission or repeat symbol can be recognized after observing the waveform over an extended period of time. Once compromised, all future data will be detectable and decodable by a hostile system.

Another prior art system that teaches a chaotic coding/modulation method is described in U.S. application Ser. No. 13/190,478, which is commonly invented by the present inventor, and incorporated herein by reference in its entirety. The system of the '478 application teaches a system, device and method for wirelessly transmitting data via a digital chaos spreading sequences. The '478 application system teaches constructing and storing a digital chaos spread code sequence in a volatile memory in both the transmitter and the receiver. The system of the '478 application eliminates the need to generate a digital chaos spread code sequence in the receiver. Information corresponding to the chaos spread sequence used to transmit the digital information is received by receiver for identifying which chaos spread code sequence to use to retrieve the coded information. The '478 application system further eliminates the reliance on the Bernoulli shift map, and therefore teaches a system which is less detectable by a hostile system.

While the system of the '478 application solves many of the problems in the prior art, the system has limited applicability to SISO systems. The receiver disclosed in the '478 application detects and processes one data stream for a single user even in the presence of other users or external interference. The '478 application therefore would not be useful for transmission systems that jointly processes a plurality of signals detected at the receiver. For example, the joint processing of multiple signals allows for increased capacity and also enhanced reception of a MIMO system.

Generally, the most fundamental issue in wireless communication lies in how efficiently and reliably data can be transmitted through a channel. The next generation multimedia mobile communication system, which has been actively researched in recent years, requires a high speed communication system capable of processing and transmitting various forms of information such as images and wireless data, different than an initial communication system providing a voice-based service.

Then according to the prior art, what is needed is a system and method that does not sacrifice data rate in favor of range, provides increased robustness, while improving LPI/LPD, in a system detecting and receiving multiple signals.

SUMMARY OF INVENTION

The present invention teaches improvements not found in the prior art. Specifically, the present invention teaches a system, device and method for wirelessly transmitting an aggregation of data via a multiplicity of a digital chaos spreading sequence. In one aspect, the invention teaches the use of plurality a priori constructed and stored digital chaos spreading code sequences for data aggregation of digital signals and digital information within multiple digital chaos waveforms. In the context of this invention, data aggregation is any method or technique whereby several different data streams—whether for a single user or multiple users—are collected or aggregated and processed together in a single payload at a transmitter or receiver. Examples include, but not limited, multiple chaos spreading sequences assigned to a single user to increase their transmission rate through at least one transmit antenna; a cooperative network scheme whereby all users received within a specified period of time are detected together, forwarded together (i.e., synchronized) as a single augmented payload through at least one transmit antenna.

In another aspect of the invention a plurality of digital chaos waveforms are chosen based on the intended application or operation. For example, a plurality of digital chaos waveforms may be chosen according to characteristics such as unity autocorrelation, very low cross-correlation, and cyclostationary properties to low PAPR at the transmitter and increased capacity by multiple simultaneous detection of digital signal and digital information with multiple digital chaos waveforms.

In another aspect of the invention, a plurality of constructed digital chaos spreading codes are stored in a volatile memory. The constructed digital chaos spreading codes may be stored in the transmitter and in the receiver.

In another aspect of the invention, with n a single group, the volatile memory may include distinct groups or memory locations for storing a constructed digital chaos spreading sequence of a length N. The digital chaos spread sequence may be partitioned into M number of groups of equal number of even number of digital chaos spreading code subsequences. Users are assigned a group ID from are stored in a sequential order. The sequential ordering can be a known order, such as formal ordering of natural numbers (e.g., 1, 2, 3, . . . ). However, the ordering does not need to be consecutive. The number is the index to sequences stored in at both the transmitter and receiver in a manner such as to provide a one-to-one correspondence between selected digital chaos spreading code sequence at the transmitter and detected and recovered index at the receiver.

In still another aspect, the invention discloses a data payload including pre-ambles and mid-ambles, wherein the data payload may be augmented for the inclusion of a signal field and a symbol delimiter within each of aggregated digital signals and digital information within multiple digital chaos waveforms so that the time of arrival of each constituent signal, part of the aggregated digital signals can be identified accurately and reliably. A signal field detailing the operational mode of the receiver containing at least one information of length of the digital signal and digital information of the transmitting data and rate of said. Further, a signal field comprised containing parity information for protection against and detection errors of other information within the signal field.

In still another aspect, the invention teaches the uses of a transmitter system with an augmented payload as described above.

In still another aspect, the invention teaches using a receiver system with an augmented payload.

In still another aspect, the invention teaches a system for transmitting a multitude of digital signal and digital information with multiple digital chaos waveforms.

In yet another aspect, the invention teaches a system for receiving a multitude of digital signal and digital information with multiple digital chaos waveforms.

In still another aspect, the invention teaches a receiver system capable of detecting each arrival times of the signal with the augmented payload of multitude of digital signals and digital information with multiple digital chaos waveforms In still another aspect, the invention teaches a receiver system capable of processing each signal field of the multitude of digital signal and digital information with multiple digital chaos waveforms and configuring the remaining receiver subsystem to recover each of digital signal and digital information with multiple digital chaos waveforms.

In yet another aspect, the invention teaches a method for improvement of multi-user detection as described above, wherein the received multitude of digital signals and digital information with multiple digital chaos waveforms undergo a process to separate the aggregated transmitted digital signal and digital information into streams projected on the null space of the all users except itself. This partition is performed for each of the identified digital signal and digital information part of the received aggregated transmitted digital signal and digital information prior to processing by the dispreading subsystem.

In yet another aspect the invention teaches a method for aggregating and embedding multiple disparate communication signals within digital chaos communication waveforms originating from a multiple antennas. The antenna elements of the multiple antenna system need not be co-located only they work in cooperation for introducing low probability intercept (LPI) and low probability of detection (LPD), reduced peak-to-average ratio (PAPR), and increased network system capacity.

BRIEF DESCRIPTION OF DRAWINGS

A more complete understanding of the present invention may be derived by referring to the various embodiments of the invention described in the detailed descriptions and drawings and figures in which like numerals denote like elements, and in which.

DETAILED DESCRIPTION

Figure 1:
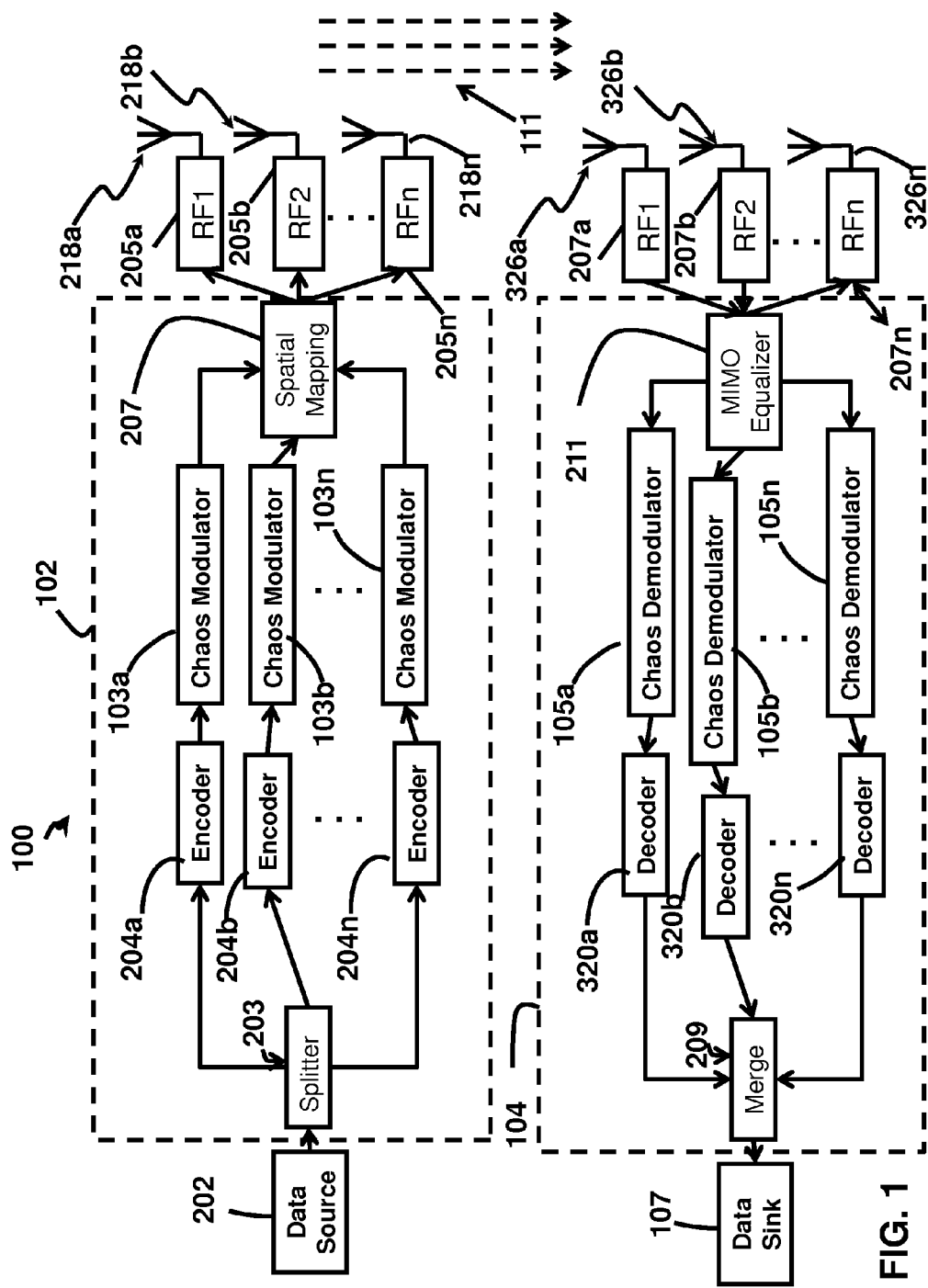
FIG. 1 is an exemplary MIMO wireless transmission system that may be used with the various embodiments of the invention.

The brief description of exemplary embodiments of the invention herein makes reference to the accompanying drawing and flowchart, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the description herein is presented for purposes of illustration only and not of limitation. For example, the steps recited in any of the method or process descriptions may be executed in any order and are not limited to the order presented.

The present invention may be described herein in terms of functional block components and various processing steps. It should be appreciated that such functional blocks may be realized by any number of hardware and/or software components configured to perform the specified functions. For example, the present invention may employ various integrated circuit (IC) components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like. For a basic introduction of cryptography, please review a text written by Bruce Schneider which is entitled "Applied Cryptography: Protocols Algorithms, And Source Code In C," published by john Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity; conventional wireless data transmission, transmitter, receivers, modulators, base station, data transmission concepts and other functional aspects of the systems (and components of the individual operating components of the systems) may not be described in detail herein. Furthermore, the connecting lines shown in the various figures contained herein are intended to represent exemplary functional relationships and/or physical couplings between the various elements. It also should be noted that many alternative or additional functional relationships or physical connections may be present in a practical electronic transaction or file transmission system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

To simplify the description of the exemplary embodiment, the invention is described as pertaining to a co-located MIMO DSSS system. However, the invention is applicable to distributive MIMO systems as well. It will be appreciated, that many applications of the present invention could be formulated. For example, the system could be used to facilitate any conventional wireless communication medium, and the like. Further, it should be appreciated that the network described herein may include any system for exchanging data or transacting business, such as the Internet, an intranet, an extranet, WAN, WLAN, WPAN, HAN, Ad hoc Networks, mobile ad hoc networks (MANET), satellite communications (SATCOM), and/or the like.

FIG. 1 is an exemplary embodiment block diagram of a MIMO system 100 useful for the invention. FIG. 1 shows a block diagram of an exemplary multiple-input-multiple-output (MIMO) communication system 100, including a transmitter-receiver wireless channel 111 for transmitting a multiple wireless signals from a transmitter 102 to a receiver 104. In an exemplary embodiment, transmitter 102 may have multiple antennas $218a$-$218n$. Similarly, receiver 104 may have multiple antennas $326a$-$326n$. The exemplary MIMO communication system 100 may be implemented as part of a wireless local area network (LAN), wireless persona area network (PAN), wireless home area network (HAN) or metropolitan area network (MAN) system, a cellular telephone system, or another type of radio or microwave frequency system incorporating one-way or two-way communications over a range of distances. The exemplary MIMO communication system 100 and its sub-components will be described below in more detail when required to facilitate the description of the present invention.

MIMO communication system 100 may employ various signal modulation and demodulation techniques, such as single-carrier frequency domain equalization (SCFDE), direct sequence spread spectrum (DSSS) or orthogonal frequency division multiplexing (OFDM), for example. However, throughout this description, references will be made with respect to a MIMO communication system or a system including a transmitter and receiver merely to facilitate the description of the invention. Further, in the interest of brevity, the description of communication system 100, may be described with respect to a wireless channel 111, although it is to be understood that the description related to wireless channel 111 apply to each wireless MIMO channel 111. All the similar components of the wireless channels 111 will also have similar descriptions to each other.

Transmitter 102 may transmit different signals from each antenna in transmit antenna array 218a-218n (transmitter antennas 218a-218n) so that each signal is received by the corresponding antenna in the receiving antenna array 326a-326n (receiving antennas 326a-326n). The signal is transmitted as an aggregate signal and received as an aggregation of all the transmit signals. All signals are transmitted once and the receiver demodulates the aggregate signal. The multiple-signal transmitter 102 may receive a data signal (i.e., multiple data and/or other types of signals received) from a data source 202 (information sequence 202) and split the data signal using a splitter 203. Splitter 203 splits the data signal into multiple signals received by multiple-signal encoders 204a-204n. Signal encoders 204a-204n may then encode the respective received signals from splitter 203. The multiple signals from encoders 204a-204n may then be modulated by respective chaos modulators 103a-103n. The signals from chaos modulator 103a-103n may then be spatially mapped 207 and upconverted into distinct radio frequencies (RF) signals (RF1 205a-RFn 205n) prior to being transmitted to the receiver 104 by respective transmitter antennas 218a-218n. Such signals may alternatively be referred to alternatively as "an aggregate signal" "data," "signals," "information sequence," and/or "data signals."

The aggregate signal is received at the receiver 104 by receiver antenna array 326a-326n and downconverted from the distinct RF signals (RF1 207a-RFn 207n) prior to being combined by MIMO equalizer 211, wherein the MIMO equalizer 211 is of traditional operation as is found in the art. The MIMO equalizer 211 equalizes the MIMO channel and recovers the transmitted symbols received by all the receiver antennas (receiver antenna array 326a-326n) and transmits the symbols to respective chaos demodulators 105a-105n. The chaos demodulators 105a-105n demodulates the received signals and sends the demodulated signals to respective decoders 320a-320n for decoding. The chaos demodulators 105a-105n receives the respective signals and recovers the original signals that were provided by the data source 202. Once decoded, the separately decoded signals are merged by signal merger 209 prior to being transmitted to a data sink 107.

As depicted in FIG. 1, the original signals recovered by the decoders 320a-320n are merged into a signal (merge 209) and may be transmitted to a connected data sink 107. Data sink 107 may include one or more devices configured to utilize or process the recovered signals. As is well known, receivers may additionally include other elements such as symbol mapper 318, symbol detection unit 316, Doppler Correction unit 314, packet detection circuit 308, AD converters 304 and the like (shown in FIGS. 2-4) which are of the type which may be found in the prior art.

As previously noted, traditional MIMO WLAN transmission has problems addressed by the present invention. Namely, prior art systems such 802.11x compliant system are more susceptible to interference, wireless collisions, and interception by unintended parties. The present invention addresses these problems by providing a system and method for aggregating and embedding multiple information-bearing communication signals within digital chaos communication waveforms occupying the same frequency channel bandwidth transmitted with a multiple antenna system. By digital chaos what is meant is a waveform generated by sampling a chaos signal, where chaos signals are determined by nonlinear dynamics: either stochastic or deterministic. Digital chaos sequences generated according to the invention as described below, is used as a spreading sequence in a transmitter 102 shown in FIG. 1.

Figure 2:
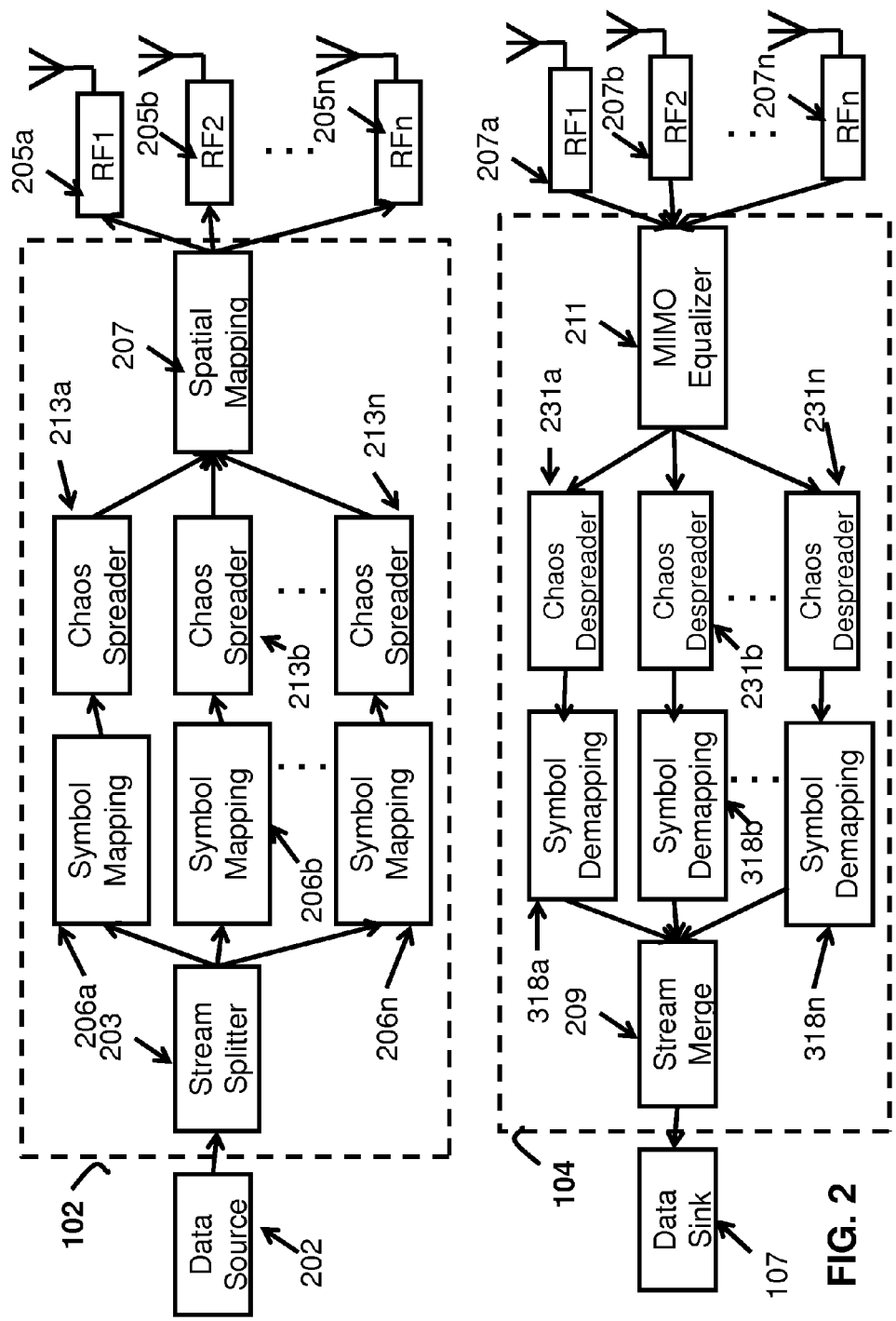
FIG. 2 is another exemplary MIMO wireless transmission system that may be used with the various embodiments of the invention.

With reference to FIG. 2, exemplary wireless MIMO transmitter 102 includes a data source 202, stream splitter 203, spatial mapper 207, RF upconverters (RF 205a-RFn 205n), of similar operation as the corresponding elements data source 202, splitter 203, spatial mapper 207, and RF upconverters RF 205a-RFn 205n as in FIG. 1. Similarly, with reference to FIG. 2 wireless MIMO receiver 104 includes downconverters (RF1 207a-RFn 207n), MIMO equalizer 211, stream merger 209 and data sink 107 of similar description and operation as the corresponding downconverters (RF1 207a-RFn 207n), MIMO equalizer 211, merger 209 and data sink 107 of FIG. 1.

With continued reference to FIG. 2, data source 202 is split into multiple distinct signals by splitter 203. Splitter 203 splits the signal into distinct signals and transmitted to respective symbol mappers 206a-206n. The symbol mapper 206a-206n may be a conventional symbol mapper including conventional transmitter components such as a scrambler, differential encoder, symbol generator or the like. Symbol mapper 206a-206n further transmits the respective signals to chaos spreader 213a-213n. Chaos spreader 213a-213n and symbol mapper 206a-206b perform modulation of the respective data signals from stream splitter with the digital chaos spreading code sequences as discussed more fully below with respect to FIG. 5. The respective modulated signals are then spatially mapped (spatial mapper 207) and upconverted (RF1 205a-RFn) prior to transmission to receiver 104, via the respective transmitter antennas via the transmitter antenna array into MIMO channel (i.e., channel 111).

FIG. 2 receiver 104 receives the respective signals and downconverts the signals (RF1 207a-RFn 207n). The downconverted signals are transmitted to MIMO equalizer 211. MIMO equalizer 211 equalizes the MIMO channel (i.e., channel 111) and recovers the transmitted symbols received by all the receiver antennas (receiver antenna array 326a-326n) and transmits the symbols to respective chaos despreader 105a-105n. The respective signals from MIMO equalizer 211 are then demodulated using chaos despreader 231a-231n and symbol demapper 318a-318n prior to being merged (stream merge 209) and provided to data sink 107.

Figure 3:
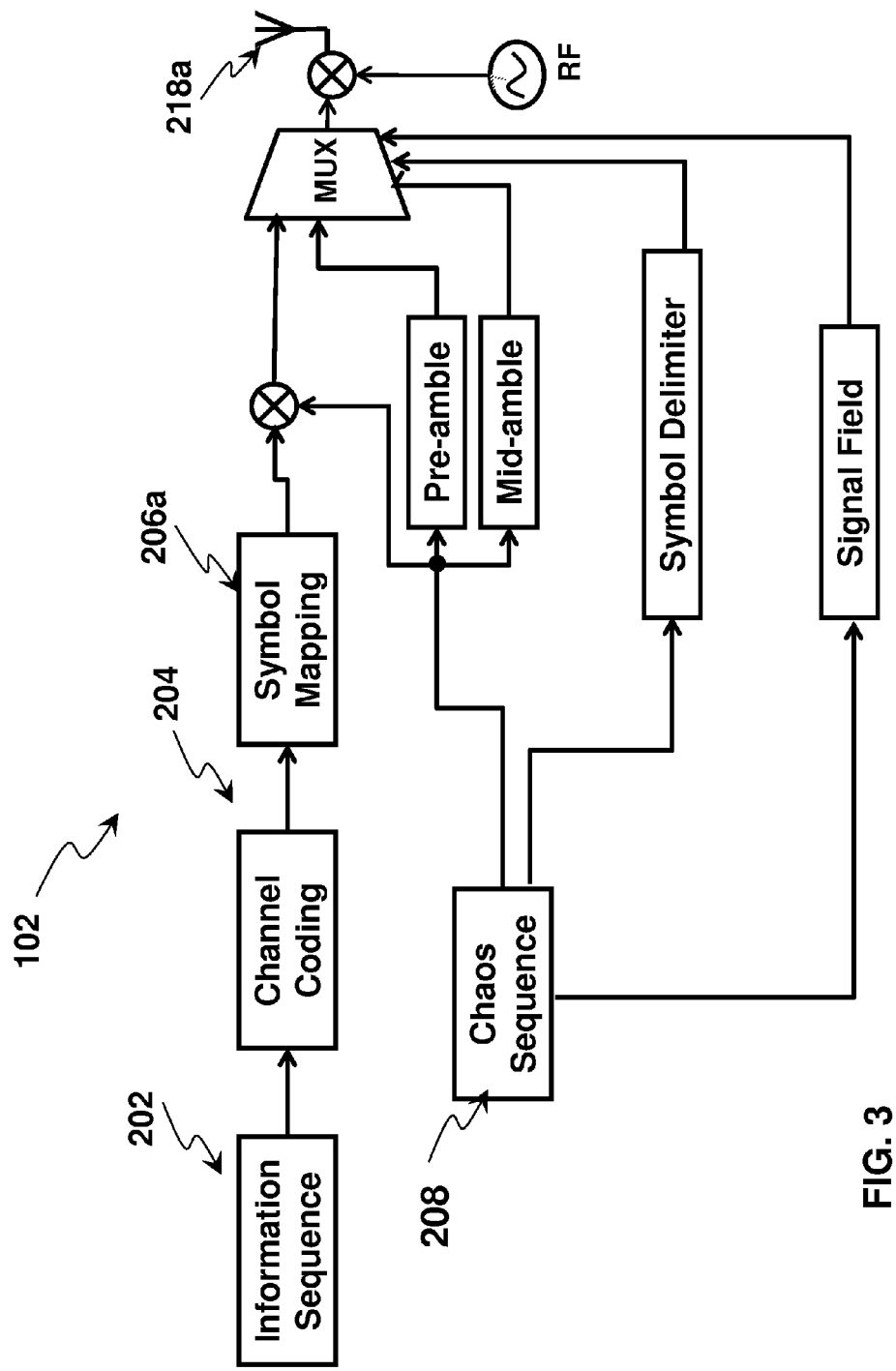
FIG. 3 is an exemplary wireless transmitter in accordance with various embodiments of the invention.

With reference to FIG. 3, what is depicted is a detail description of one of the exemplary multiple transmission streams of the MIMO transmitter 102 of FIGS. 1 and 2. It should be understood that a similar description of similar elements applies to any one of the transmissions streams noted above. In FIG. 3, transmitter 102 further includes a chaos sequence memory 208, the operation of which is discussed with respect to FIG. 5. The chaos sequence memory 208 stores digital chaos sequences as discussed below.

Figure 5:
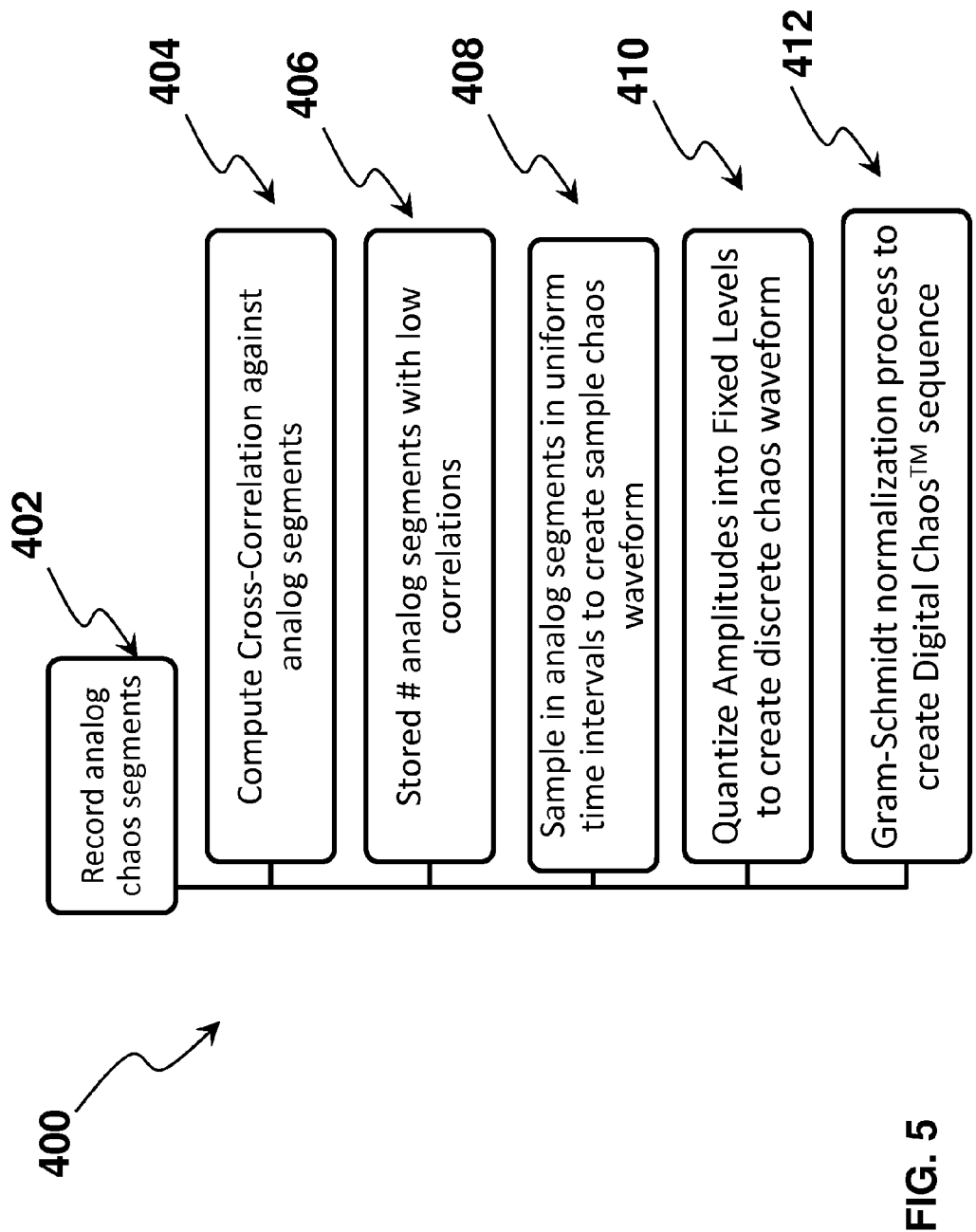
FIG. 5 is a flowchart of an exemplary method for constructing of a digital chaos sequence according to various embodiments of the present invention.
Figure 6:
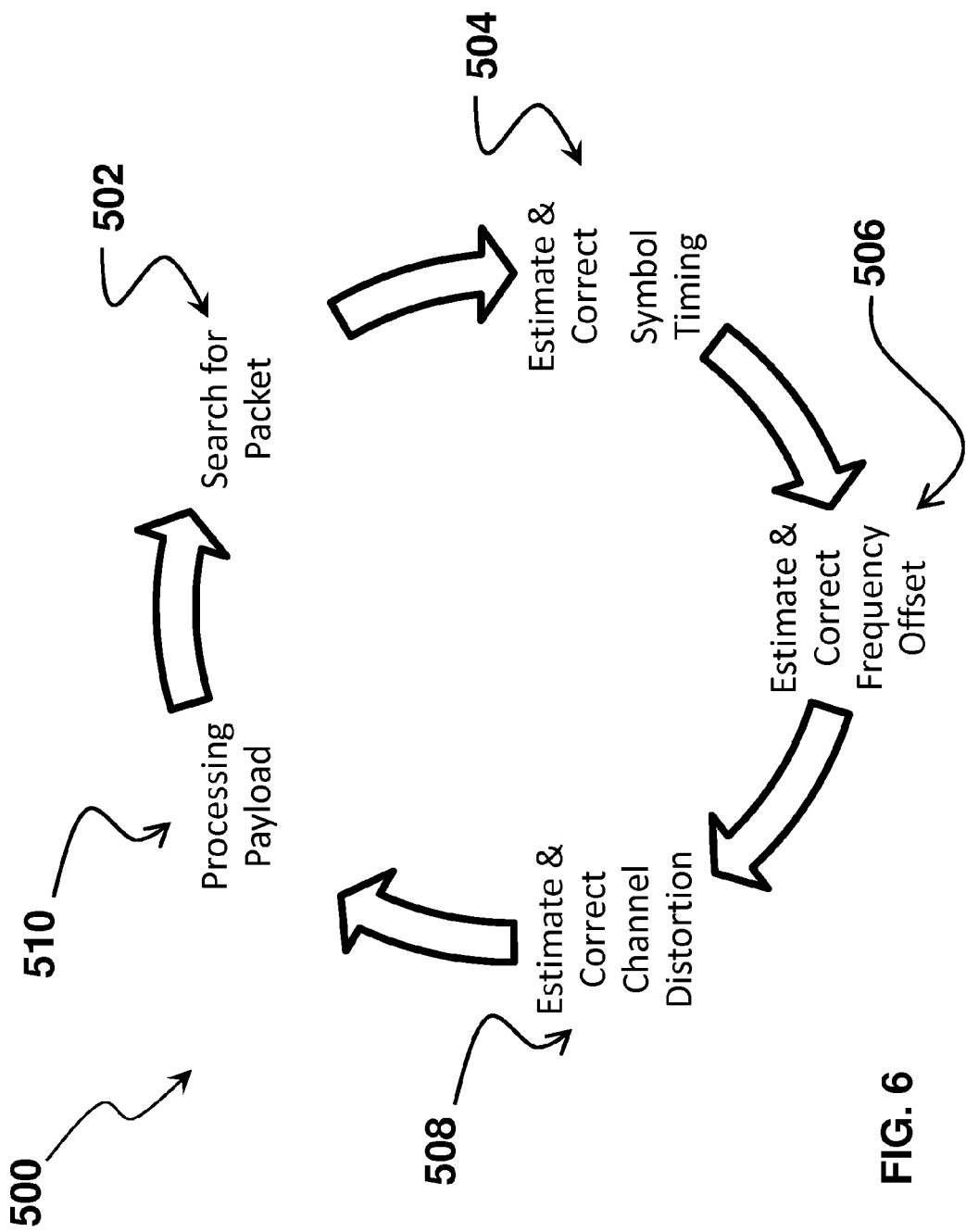
FIG. 6 is an exemplary receiver synchronization process according to various embodiments of the invention.

The digital chaos sequences stored in chaos sequence memory 208 are constructed according to the digital chaos sequence generation method of FIG. 5. With reference to FIG. 5, digital chaos construction method 400, the digital chaos spreading code sequence is constructed by recording native analog chaos circuit or computer simulated non-linear dynamics of deterministic or stochastic mapping characteristics (Step 402). The recorded segments are sampled such that successive samples appear independent and segments of a predefined length and variable quantity have low cross correlation (Step 404). Those samples may then be stored in memory (Step 406). Sampling rate can be varied or irregular, but the number of samples taken is fixed for a particular spreading factor and can be any number (Step 408). Moreover, the period over which you sample can be varied. In accordance with the invention, the segments are quantized (Step 410). The quantized recorded segments undergo the Gram-Schmidt (GS) process (Step 412). The GS process on the sequence ensures that autocorrelation peak occurs at unity or near unity and cross-correlation between sequences is zero or nearly zero (e.g. m low cross-correlation)—within the precision of the quantization process. In one exemplary embodiment, the cross-correlation is less than −10 dB.

An Irregular sampling interval according to the invention may be, for example, determined by modulo counting of known sequence generator such as Fibonacci numbers, Lucas numbers, Perrin numbers or any pseudo random number generators. For implementation ease with semiconductor technologies for digital systems, the amplitudes may be quantized to finite levels based on the maximum allowed cross-correlation ($\frac{1}{2}^L$, where is L is the number of bits used to represent by each sample amplitude) between code sequences. Independent segments or the digital chaos sequences are grouped together to form a vector span for transmitting the information-bearing communication signals or training signals. The final step of the digital chaos process is to convert the independent digital chaos segments into a group of orthonormal sequences spanning the same subspace as the original segment. This process is performed using the Gram-Schmidt orthogonalization procedure.

The memory may be partitioned such that groups of digital chaos spreading codes are stored independently of each other. For example, the distinct groups may be organized according to the application for which it will be used. Typical applications include any wireless applications requiring voice over IP (VoIP) capability, video capability, and data capability for point-to-point operation and/or point-to-multi-point. Inside the groups, the volatile memory is further partitioned into slots for storing a digital chaos sequence code. The slot is further partitioned into a plurality of sub-slots for storing subsets of the of the digital chaos sequence.

Figure 7:
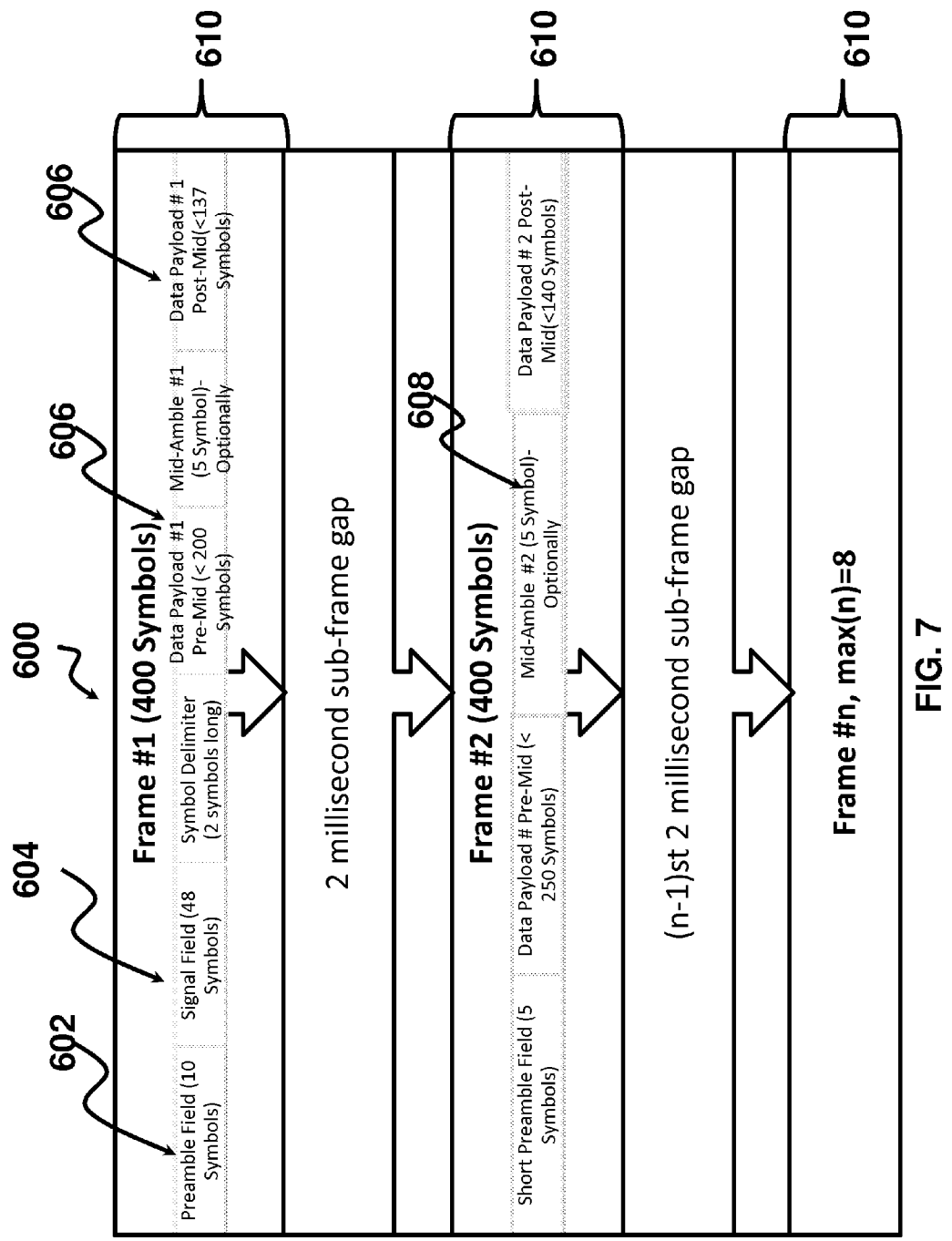
FIG. 7 is an exemplary embodiment of packet formation according to various embodiments of the invention.

Once the chaos sequence memory 208 is fully populated with digital chaos spreading sequences, the memory 208, the entire memory 208 is subjected to Gram-Schmidt procedure, which converts the independent digital chaos segments into a group of orthonormal sequences spanning the same subspace as the original segment. The memory requirement after the Gram-Schmidt procedure is unchanged from those of the quantized segments. It is well-known in mathematics that any signal in an n-dimensional subspace can be unique represented an n scalar values that corresponds to the projection of the signal onto the orthonormal bases of the n-dimensional thus the need for Gram-Schmidt process in this invention method of apparatus A preferred embodiment of the invention for the packet formation is shown in FIG. 7. In this exemplary embodiment the sample rate at the receiver is targeted at 20 MHz and the chipping rate is proposed at 4 Mcps at the transmitter. The minimum center frequency spacing between adjacent systems will be 5 MHz. The framing structure may be a radio frame of 10 ms divided into 5 sub-frames of equal duration 2 milliseconds (ms) (600). These sub-frames may be configured as transmit or receive slot for any user.

A super-frame consists of several frames transmitted in succession with 2 ms gap spacing between frames (610). Each frame to be transmitted consists of a preamble training sequence, mid-amble training sequence, and data payload. The flexibility of frame structure can accommodate a number of other embodiments catered to specific application. In this embodiment, sufficient training information is included to detect securely and reliably. However, other embodiments might exists that make different trades for different application requirements, For example, the length of the preamble, gap spacing between the frames or the whether a mid-amble is included may depend on the application chosen.

As is well known, the key to a successful wireless design is to incorporate sufficient training information to recognize the arrival of packets, align symbol boundaries, estimate channel characteristic and correct for frequency offset. This embodiment utilizes a header field comprises of a ten symbol preamble (602) and 48 symbol signal field (604) that defines the configuration state for the receiver. The data portion of the frame varies from 0-200 symbols or 1-250 symbols (606) depending if it is the first frame of a super frame. The mid-amble, if transmitted, consists of five additional training sequences in the middle of the frame (608). All training sequences are modulated using differential chaos shift keying (DCSK) and repeated a predetermined number of times; nine times and five times are shown for the preamble and mid-ambles, respectively, in FIG. 7. Each repetition is modulated with either a 1 or −1 according to normal DCSK techniques. The modulation input can be an alternating sequence of positive and negative ones, which embeds with control information for the rest of the packet. The preamble and mid-ambles can have their powers significantly higher that the data to aid in the synchronization at the receiver. For example, one embodiment used a 3 dB boosted in relative power to the data samples. This will permit the high probability of detection without an overly burdensome overhead for the frame. If total overhead is 10% or less in duration for the frame, significant improvement in detection and synchronization at the receiver is achievable for sacrificing only 0.79 dB is signal power compared to no power boost. Each symbol is comprised of a chaos sequence of predetermined length that can range from 16 chips to 4000 chips, depending on the application requirements for throughput and covertness. The symbol delimiter field is a predetermined length. An preferred embodiment of the digital chaos used as twice that of those used to spread the data. One skilled in the art may choose a different length to meet other application or performance requirements. The signal field is comprised on a 6 bit scrambling seed, which is used to initialize the pseudorandom number (pn) generator for sequence pattern and error check parity bits. The state of the registers of the pn determines which of $2^6$ stored sequence is selected or, optionally, which sequence in the chaos family should be transmitted for the current symbol.

With return reference to FIG. 3, transmitter 102 receives information bearing signals 202 (i.e., information sequence 202). The format of data information of 202 may be bits, symbols, or sampled analog waveforms. The high speed chaos spreading sequence 208 multiplies the channel coded bits or symbol or directly the sampled analog waveform. The high speed chaos spreading transform the bit, symbol, or sample analog waveform into a digital chaos waveform with information embedded in the amplitude and phase of the digital chaos waveform compared to an exact replica 306 at the receiver.

Figure 4:
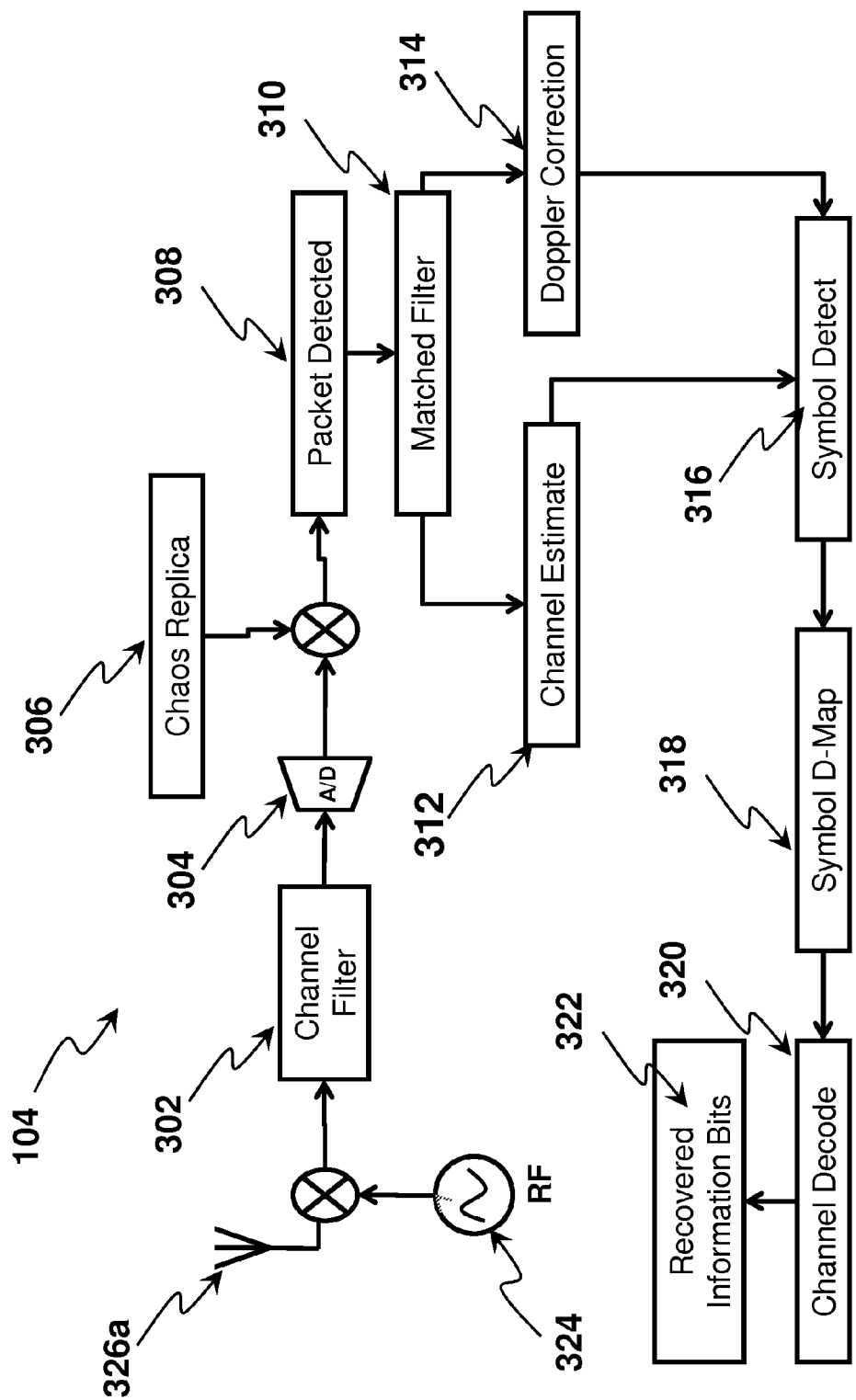
FIG. 4 is an exemplary wireless receiver in accordance with various embodiments of the invention.

The signal transmitted by transmitter 102 is received by digital chaos receiver 104 which recovers the embedded data. FIG. 4 is an exemplary embodiment of a receiver 104 according to the present invention. Receiver 104 includes an antenna 326a for receiving the transmitted signal, channel filter 302 to reject signals not in the band of interest, analog-to-digital (A/D) converter 304 is used to sample and quantization the analog signal suitable for digital processing, chaos replica repository 306 need for despreading, packet detection 308 to determine when at least one packet arrives, matched filter 310 to recover symbol timing for at least one signal, channel estimate 312 to estimate and compensate the distortions to the waveform due to multipath fading, Doppler Correction 314 to estimate and correct frequency offsets to due oscillator drift and mobility, symbol detect 316 to estimate the mapping symbol sent by the transmitter, symbol D-map look-up table 318 to recover informational symbol, Channel Decode 320 to recover the original transmitted bits.

In recovering the data, receiver 104 receives the transmitted signal and recovers the data signal by the following steps: The packets are continually searched until the receiver detects the arrival of a valid packet (502). The detection of the packet is based on the output of a free-running correlation (308) that exploits the preamble structure. The validity of the packet is determined from the cyclic redundancy check (CRC) of the signal field (604). After the packet has been declared valid, the preamble is used to perform two synchronization processes: symbol timing estimation & correction (504) and frequency estimation & correction (506). A match filter or bank of matched filter (310) is used to estimate the timing error and the appropriate correction is made in the receiver timing. A separate correlator is used to estimate the frequency errors (314) and the appropriate correction is applied to the baseband received signal. The channel estimate is computed using the pre-computed convolution matrix based on the training symbols from the preamble. The pseudo inverse of this matrix, which can be also computed off-line since it doesn't change unless the preamble changes, is used to compute the minimum mean square estimate of the channel taps (312) (508). Averaging is possible for each of process steps 502, 504, 506, and 508 based on the repetition of the training symbols in both the preamble and mid-amble. The final processing step to process the payload (510), which consists of symbol detect (316), Symbol D-Map (318), Channel Decode (320), and finally, recovery of the information bits (322). It should be noted that there are two common receiver modes as preferred embodiments. One, the high speed multiplication with Chaos replica 306 occurs directly after the A/D. This embodiment is preferred when a sampled analog waveform is the information-bearing signal as shown in FIG. 2. Two, the high speed multiplication with Chaos replica 306 occurs prior symbol detect 316 and after Doppler Correction 314 and Channel Estimation. This embodiment is best suited when the information-bearing signals are bits or symbols. Either configuration works for the information-bearing signals in the form of bits or symbol, however configuration two has the best performance and configuration one has the lower power consumptions. An improvement in the recovery of the information bits (322) is achievable if the data portion of the aggregated transmitted digital signal and digital information undergoes an addition process step prior to dispreading. This process step requires separate digital streams to be constructed based on the null space of all signals except the one to be recovered. This process is repeated for each signal declared valid by the check (CRC) of the signal field (604).

Figure 8:
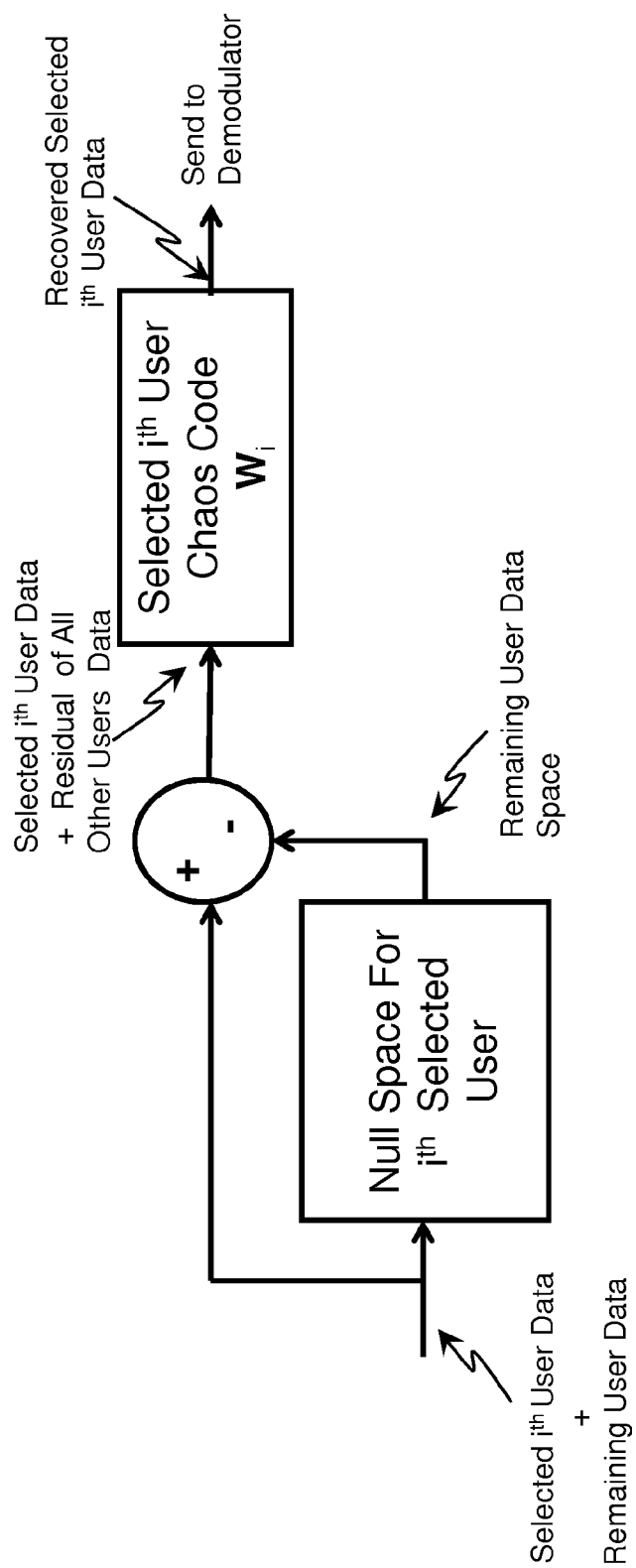
FIG. 8 is an exemplary embodiment of null-space processor subsystem of the invention.

FIG. 8 is an embodiment of an exemplary null-space processor subsystem which may be useful with this invention. In accordance with this exemplary subsystem, the signal to be recovered ("the Selected $i^{th}$ User Data") and the remaining signals (the "Remaining User Data") are multiplied in the null space processor (Null Space for $i^{th}$ Selected User corresponding to the Selected $i^{th}$ User Data producing a signal containing the Remaining User Data signals. The Remaining User Data signals are then subtracted from the signal containing the Selected $i^{th}$ User Data and the Remaining User Data such that Selected $i^{th}$ User Data is output. In some instances, the output Selected $i^{th}$ User Data may appear with residual signals from the Remaining User Data. The Selected $i^{th}$ User Data may then be recovered by using the Selected $i^{th}$ User Data to identify the $i^{th}$ User Chaos Code for recovering the $i^{th}$ User Data as described above with respect to FIG. 4.

It should be appreciated by one skilled in art, that the present invention may be utilized in any device that implements the DSSS encoding scheme. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

We claim:

1. A method of processing an aggregate data signal in wireless transmission, comprising:
   a. receiving an aggregate data signal at a receiving side, the aggregate data signal having a plurality of distinct data signals containing distinct user data signals originating from a plurality of users, wherein each one of the plurality of distinct data signals is modulated with a distinct chaos sequence at a transmitting side, and
   b. demodulating the each one of the plurality of distinct data signal at the receiving side to extract the distinct user data signals, the modulating of the each one of the plurality of data signals being performed using a generated digital chaos sequence database containing the distinct chaos sequence, wherein the generating of the distinct digital chaos sequence comprises, recording a featureless waveform having nonlinear dynamics, sampling a fixed number of samples for a particular spreading factor, storing a varied quantity of groups of the fixed number of samples for a particular spreading factor to form the entries of the database, such that the groups of fixed number of samples for a particular spreading factor are distinct with low cross-correlation amongst the groups, and then processing all the groups segments using Gram-Schmidt process.

2. A method of claim 1, wherein the featureless waveform is one of at least one of a native analog chaos waveform, a period waveform, computer simulated non-linear dynamics of a deterministic mapping characteristic, or stochastic mapping characteristic.

3. The method of claim 1, each one of the plurality of distinct data signals includes control bits in a pre-amble and a mid-amble of the plurality of distinct data signals.

4. A method of processing an aggregate data signal in wireless transmission, comprising:
   a. receiving an aggregate data signal at a receiving side, the aggregate data signal having a plurality of distinct data signals containing distinct user data signals originating from a plurality of users, wherein each one of the plurality of distinct data signals is modulated with a distinct chaos sequence at a transmitting side, and
   b. demodulating the each one of the plurality of distinct data signal at the receiving side to extract the distinct user data signals, the modulating of the each one of the plurality of data signals being performed using a generated digital chaos sequence database containing the distinct chaos sequence, wherein the generating of the distinct digital chaos sequence comprises, recording a featureless waveform having nonlinear dynamics, sampling a fixed number of samples for a particular spreading factor to produce a group of independent digital chaos segments, storing a varied quantities of digital chaos segments groups and converting the group of independent digital chaos segments into a group of orthonormal sequences spanning the same subspace as the group of independent digital chaos segments.

* * * * *